United States Patent
Cutler

[19]

[11] Patent Number: 5,825,491
[45] Date of Patent: *Oct. 20, 1998

[54] INTERFEROMETER ALIGNMENT SYSTEM UTILIZING A STEP CALIBRATION

[75] Inventor: David J. Cutler, NR Amersham, England

[73] Assignee: Perkin-Elmer Ltd., Beaconsfield, England

[ * ] Notice: This patent issued on a continued prosecution application filed under 37 CFR 1.53(d), and is subject to the twenty year patent term provisions of 35 U.S.C. 154(a)(2).

[21] Appl. No.: 608,654

[22] Filed: Feb. 29, 1996

[30] Foreign Application Priority Data

Mar. 3, 1995 [EP] European Pat. Off. ............... 95301395

[51] Int. Cl.$^6$ ........................................................ G01B 9/02
[52] U.S. Cl. ............................................. 356/345; 356/346
[58] Field of Search ................................... 356/351, 345, 356/346

[56] References Cited

U.S. PATENT DOCUMENTS 4,053,231  10/1977  Fletcher et al. ........................... 356/346
4,684,255  8/1987  Ford ......................................... 356/346

FOREIGN PATENT DOCUMENTS 8403560  9/1984  WIPO .

OTHER PUBLICATIONS

Soviet Journal Of Optical Technology, vol. 54, No. 2, Feb. 1987, New York, US pp. 110–111, V.I. Erashov, "An Automatic Alignment System for a Fourier Spectrometer".

*Primary Examiner*—Robert Kim
*Attorney, Agent, or Firm*—David Aker

[57] ABSTRACT

An interferometer comprises a source of radiation (10) and a beam splitter (12) for forming two beams. The beams travel along different optical paths and the optical path difference of the paths can be varies by rotatable mirror pairs M2/M3 and M4/M5. One of the paths includes an adjustable mirror M6 which is tiltable in orthogonal directions. A control unit (18) can be automatically initiate periodically an alignment procedure for aligning the interferometer.

11 Claims, 3 Drawing Sheets

INTERFEROMETER ALIGNMENT SYSTEM UTILIZING A STEP CALIBRATION

This invention relates to interferometers and particularly relates to interferometers of the split beam type. The invention is particularly concerned with the alignment of such interferometers.

A known type of interferometer is the Michelson type. In such an interferometer radiation from a suitable source is directed towards a beam splitter which is usually located in the path of the radiation and orientated at approximately 45° to that path. The beam splitter forms the incoming beam into two beams which propagate along optical paths having substantially the same optical path length. Each path includes a mirror for reflecting the radiation back to the beam splitter where the beam is recombined and then propagates to a suitable detector.

In such interferometers one of the paths often includes a means which enables differences to be introduced between the optical path length of each beam, so that radiation propagating along each path travels a slightly different distance before recombination. This can be achieved, for example, by making one of the reflecting mirrors translatable, or rotatable in the case of a rotatable parallel mirror pair.

The signal which is received at the detector varies as a function of the path difference introduced and produces an interferogram. Interferograms are used, for example, in conjunction with spectrophotometers in Fourier Transform spectroscopy. No further details of such arrangements are necessary since they are not considered essential to understanding the present invention, but an example can be found, for example, by referring to U.S. Pat. No. 4,684,255.

A problem with interferometers of the above-described type is misalignment of the mirrors which results in the two split beams failing to recombine at the correct position and angle on the beam splitter. Misalignment occurs because of mechanical and thermal effects which result in a gradual misalignment occurring over a period of a few hours.

In conventional interferometers it is known to provide an operator with a means for carrying out an alignment process, e.g. by appropriate adjustment, such as tilting, of a mirror. The present invention is concerned with an improved technique for aligning an interferometer.

According to one aspect of the present invention there is provided an interferometer in which a beam splitter is arranged to split an incoming beam of radiation so that one portion propagates along a first optical path and the other portion propagates along a second optical path, each optical path having means for reflecting the radiation back towards the beam splitter for recombination, means for varying the optical path difference of the first and second optical paths, one of said optical paths having an adjustable reflector, a detector for receiving the combined beams from the beam splitter, and control means for controlling operation of the interferometer characterised in that the control means is operative automatically to periodically effect an alignment procedure of the reflectors.

The interferometer may include means for tilting the adjustable reflector in substantially orthogonal directions. The means for varying the optical path difference may comprise rotatable mirror pairs. The interferometer may be an interferometer of the Michelson type. The control means may be arranged to carry out an alignment procedure in which a series of spectra are recorded, at least some of the spectra being obtained with the adjustable mirror in different positions, the spectra are processed to provide a series of numbers, and said numbers are combined to provide data which represents the degree of adjustment required to the adjustable mirror in order to provide correct alignment of the interferometer. In one form of the invention the numbers obtained by the control means can be represented as $I_{o,o}$, $I_{p,o}$, $I_{m,o}$, $I_{o,p}$ and $I_{o,m}$. These numbers can be combined in accordance with the following formulae $$\Delta_1 = \frac{(I_{p0} - I_{m0}) \cdot \Delta N}{4I_{00} - (I_{p0} + I_{m0} + I_{0p} + I_{0m})}$$

$$\& \Delta_2 = \frac{(I_{0p} - I_{0m}) \cdot \Delta N}{4I_{00} - (I_{p0} + I_{m0} + I_{0p} = I_{0m})}$$

where $\Delta_1$ and $\Delta_2$ represent the amounts by which the movable mirror has to be moved in order to achieve alignment. The mirror may be adjustable by two motors operating under the control of the control means. In the case of the equations given above the mirror should be tiltable in orthogonal directions.

A significant feature of the alignment technique is the fact that the control means generates single numbers which are used in the evaluation of alignment criteria.

The invention will be described now by way of example only, with particular reference to the accompanying drawings. In the drawings.

Figure 1:
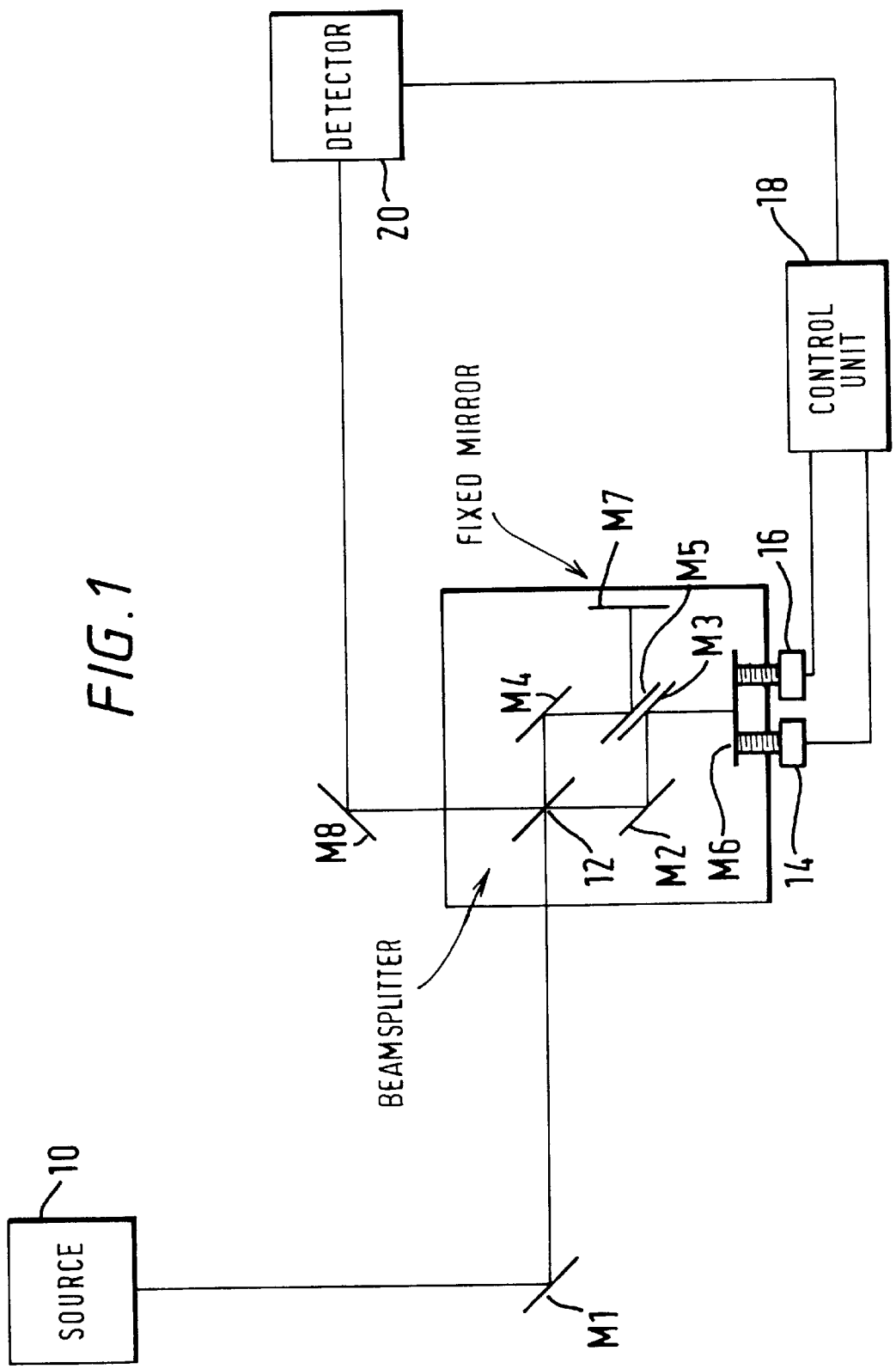
FIG. 1 is a schematic illustration of an interferometer provided with an alignment facility in accordance with the present invention.

The interferometer shown in FIG. 1 is a schematic illustration. The various elements of the interferometer will be familiar to those skilled in the art and it is not intended to give a full description of the way in which each element operates since those are known in the art. The purpose of FIG. 1 is to illustrate the alignment technique which forms the subject of the present invention and it is believed that this will be sufficient to enable a man skilled in the art to implement the technique in known interferometers.

Referring to FIG. 1, a source (10) of radiation which may be optical or near optical, e.g. infrared, produces a beam of radiation which is directed towards a mirror (M1) and then towards a beam splitter (12). The beam splitter splits the incoming beam into two partial beams, one of which propagates by way of mirrors (M2 and M3) to a mirror (M6) and the other of which propagates by way of mirrors (M4 and M5) to a mirror (M7). The mirrors M2/M3 and M4/M5 form rotating parallel pairs which can provide a variable optical path difference between the partial beams. The mirror (M7) is a permanently fixed mirror, whilst the mirror (M6) is a movable mirror. The mirror (M6) can be moved by tilting in orthogonal directions by operating one or both of two motors (14, 16) which operate under the control of a control unit (18). The mirrors (M6 and M7) reflect their respective beams back along the incoming paths to the beam splitter, where the beams recombine and are transmitted by way of mirror (M8) to a detector (20).

It will be appreciated by those skilled in the art that in normal use of the interferometer, what is known as an interferogram is produced at the detector (20). In such operation it is usual to vary the optical path difference between the split beams generated by the beam splitter (12), e.g. by rotating the parallel pairs M2/M3 and M4/M5. The interferogram can be used, for example, in conjunction with an IR-spectrophotometer in IR-FT spectroscopy. Details of such a technique are not being given here, but can be found, for example, in U.S. Pat. No. 4,684,255.

It is critical in the operation of the interferometer that the mirrors, in particular mirrors (M6 and M7) be aligned correctly, since otherwise the beams which are returned to the beam splitter (12) do not combine correctly. Misalignment can occur during operation of the interferometer due to mechanical and thermal effects and this misalignment manifests itself gradually over a number of hours.

In the present arrangement the control means (18) includes a processing facility which from time-to-time is arranged to carry out automatically a realignment method. In this method the tiltable mirror (M6) is caused to be tilted a small amount in two, typically orthogonal, directions and single beam spectra are recorded by the detector (20) at different angles of the mirror. Also one spectrum is obtained with the mirror (M6) in its original position.

The spectra obtained are multiplied by a function $f(\bar{\upsilon})$ which is intended to take account of the varying sensitivity of different wavelengths to misalignment. The spectra are also divided by a function $g(\bar{\upsilon})$ intended to take account of the reliability of the readings at any particular wavelength and by a standard single beam spectrum. The resulting spectrum is summed to give a single number and during the alignment technique five such numbers are obtained. These are $I_{o,o}$, $I_{p,o}$, $I_{m,o}$, $I_{o,p}$ and $I_{o,m}$.

These numbers are then combined in the following manner in order to provide the alignment criteria required $$\Delta_1 = \frac{(I_{p0} - I_{m0}) \cdot \Delta N}{4I_{00} - (I_{p0} + I_{m0} + I_{0p} + I_{0m})}$$

$$\& \Delta_2 = \frac{(I_{0p} - I_{0m}) \cdot \Delta N}{4I_{00} - (I_{p0} + I_{m0} + I_{0p} = I_{0m})}$$

In these equations $\Delta_1$ and $\Delta_2$ represent the amounts by which the mirror (M6) has to be tilted by the motors (14 and 16) and $\Delta N$ is the amount the motors are moved to misalign the interferometer.

An alternative way of combining the numbers is as follows $$\Delta_1 = \frac{(I_{p0} - I_{m0})\Delta N}{4I_{00} - 2(I_{p0} + I_{m0})}$$

$$\& \Delta_2 = \frac{(I_{0p} - I_{0m})\Delta N}{4I_{00} - 2(I_{0p} + I_{0m})}$$

The above equations are derived on the basis of the following assumptions:

1) The motors (14) and (16) are moved equal amounts to produce misalignment.
2) The motors are moved in orthogonal directions.
3) Misalignment is assumed to vary quadratically with the degree of movement.

The control means (18) carries out this alignment process automatically at specified intervals and hence the need for operator action in order to align the apparatus is obviated. The function $f(\bar{\upsilon})$ is a function to weight the single beam spectrum in dependence upon wavelength $$\bar{\upsilon} = \frac{1}{\text{wavelength}}$$

An example of such a function is $$f(\bar{\upsilon}) = \bar{\upsilon}^2.$$

Figure 3:
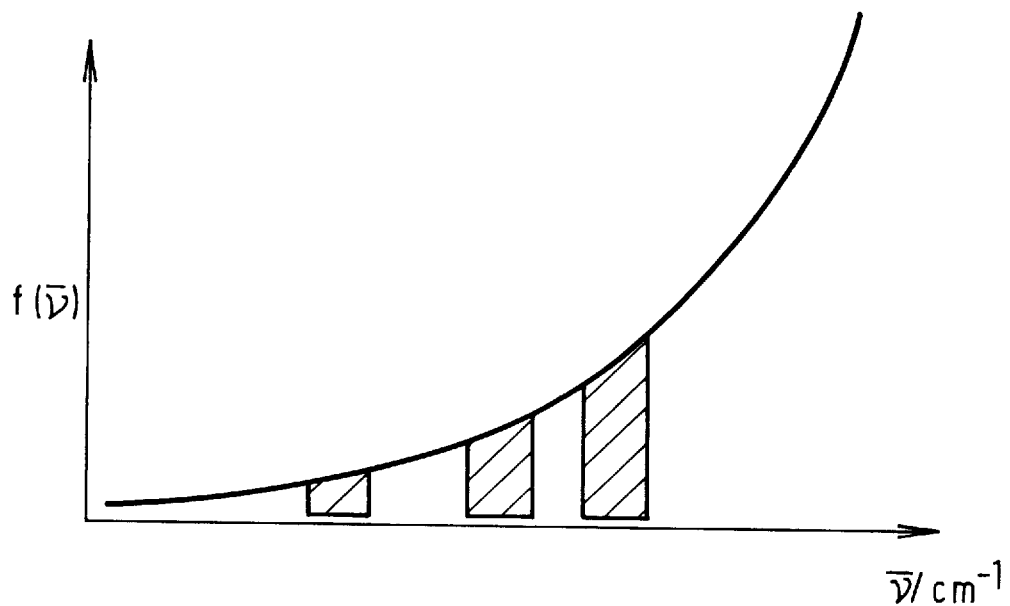
FIGS. 3 and 4 are graphs illustrating weighting functions which can be applied during the operation of the alignment facility.

This function takes account of the fact that the apparatus has greater sensitivity at shorter wavelengths (higher $\upsilon$) to the misalignment and this is illustrated in FIG. 3 of the drawings, which is a plot of $f(\bar{\upsilon})$ against $\bar{\upsilon}$. For regions of the spectrum where interference from the atmosphere, for example, makes the ordinate scale unreliable (shaded areas on FIG. 3) the function may be set to zero to minimise any effects.

Figure 4:
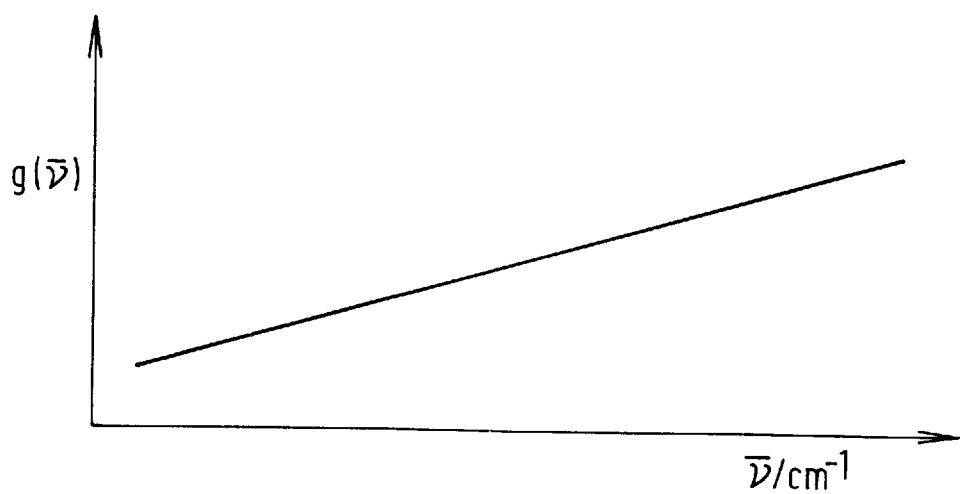

The function $g(\bar{\upsilon})$ is a function which is provided to de-weight the single beam spectrum for its variance (or standard deviation). The function (see FIG. 4) takes the form shown since a single beam generally has lower energy and hence greater uncertainty at higher $\bar{\upsilon}$. The particular form of the function will be instrument specific, but will be essentially constant.

Figure 2:
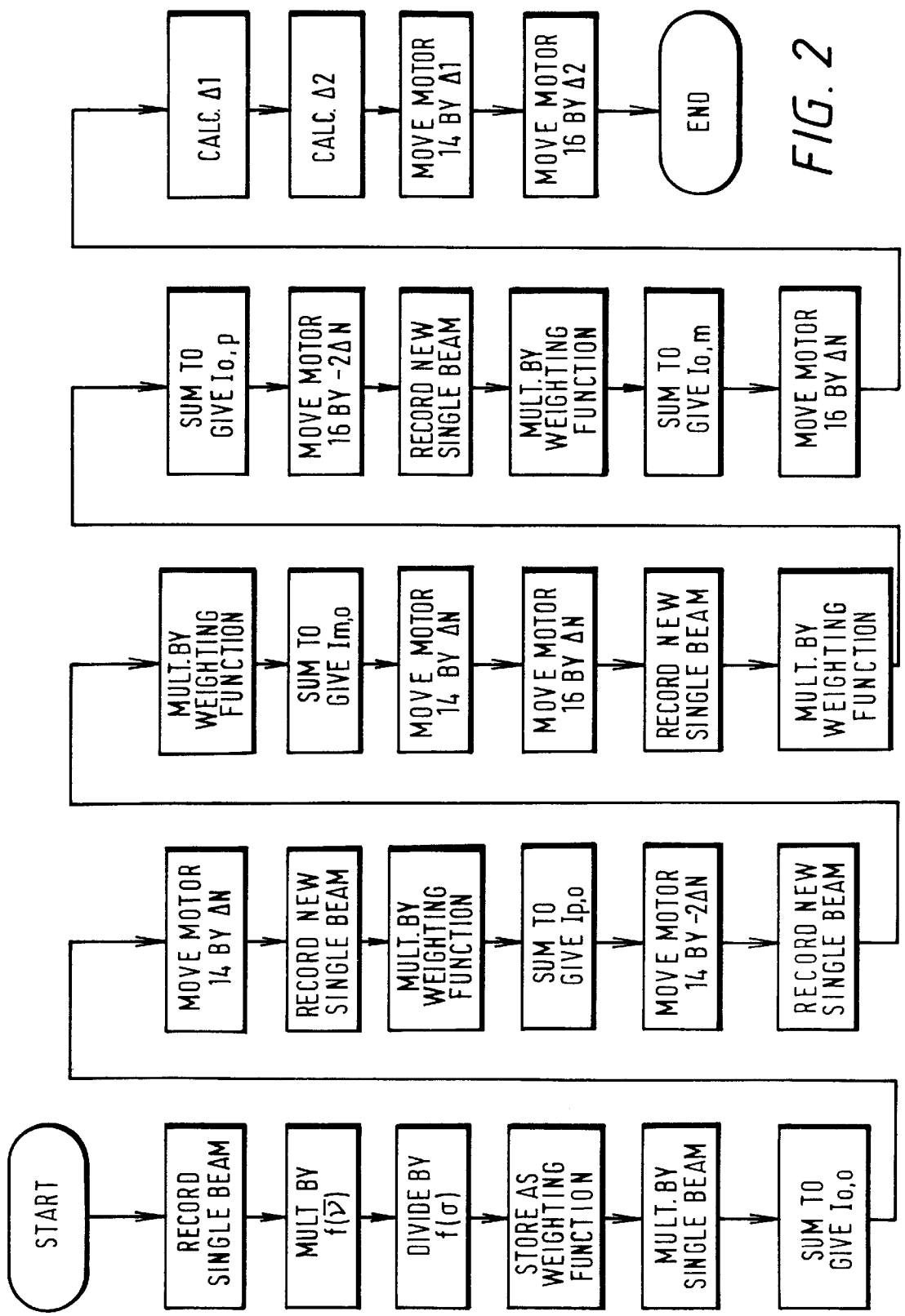
FIG. 2 is a flow diagram illustrating the steps carried out by the control means of the interferometer of FIG. 1 during an alignment operation.

FIG. 2 of the drawings illustrates the steps through which the control means (18) operates in order to carry out alignment.

After starting the first step is to record a single beam spectrum which is then multiplied by the function $f(\bar{\upsilon})$ and divided by the function $g(\bar{\upsilon})$. The result is then stored as a weighting function and multiplied by a single beam and then summed to give the number $I_{o,o}$. It will be appreciated that the data representating of the spectra include complex numbers. The summing can be performed in various ways. One way is to use a phase corrected spectrum which efficiently eliminates the imaginary part of each number. Another way is to sum the real and imaginary parts separately, that is to say to sum with the complex spectrum uncorrected. The next step is to instruct the motor (14) to move by $\Delta N$. Then a new single beam spectrum is recorded then multiplied by the weighting function and summed to give the number $I_{po}$. The next step is to instruct the motor (14) to move by $-2\Delta N$ and then a further spectrum is recorded, multiplied by weight function and summed to give the number $I_{mo}$. The next step is to move the motor (14) by $\Delta N$ and the motor (16) by $\Delta N$ then record a new single beam spectrum multiplied by the weighting function and summed to give the number $I_{op}$. Then the motor (16) is instructed to move by $-2\Delta N$ and new single beam spectrum is recorded and multiplied by a weighting function and summed to give $I_{om}$. Then the motor (14) is instructed to move by $\Delta N$ and then the control means calculates $\Delta_1$ and $\Delta_2$ according to the expressions referred to above. Finally the control means (18) instructs the motor (14) to move by $\Delta_1$ and the motor (16) to move by $\Delta_2$ to provide alignment of the mirrors.

The control means (18) can be programmed to initiate the alignment procedure at specified intervals.

I claim:

1. An interferometer comprising:
    a beam splitter arranged to split an incoming beam of radiation so that a first portion propagates along a first optical path and a second portion propagates along a second optical path;
    means for reflecting said first portion of radiation back towards said beam splitter;
    means for reflecting said second portion of radiation back towards said beam splitter, said means adjustable in at least a first orthogonal direction and a second orthogonal direction;
    means for varying the optical path difference of said first and second optical paths;
    a detector for receiving the combined beams from said beam splitter; and
    control means for periodically adjusting said adjustable reflector means, said control means causing said adjustable reflector means to move in steps to a plurality of positions in at least said first orthogonal direction and a plurality of positions in at least said second orthogonal direction, wherein said plurality of positions in at least said first orthogonal direction include at least one position of misalignment of said adjustable reflector means and said plurality of positions in at least said second orthogonal direction include at least one position of misalignment of said adjustable reflector means;

means for causing spectra to be recorded and an adjustment factor to be calculated at each position;

said control means further causing said adjustable reflector means to move to a final stationary position calculated from said adjustment factors.

2. An interferometer according to claim 1 wherein, said recorded spectra are multiplied by a first function to compensate for wavelength sensitivity to said positions of said adjustable reflector means and said spectra are divided by a second function to compensate for said spectra's standard deviation, and the result of said multiplication and said division are summed to yield said adjustment factors.

3. An interferometer according to claim 2 wherein, said first function is equal to $(1/w)^2$ where w is the wavelength at each point in the spectra, and said second function is a linear function specific to said interferometer.

4. An interferometer according to claim 1 wherein, said plurality of positions in said first orthogonal direction include an initial position, a second position located a distance $\Delta N$ from said initial position and a third position located at a distance $-2(\Delta N)$ from said initial position, and said plurality of positions in said second orthogonal direction include a fourth position located a distance $AN$ from said initial position and a fifth position located at a distance $-2(\Delta N)$ from said initial position.

5. An interferometer according to claim 4 wherein, said final position of said adjustable reflector means is determined by the formulae $$\Delta_1 = \frac{(I_{p0} - I_{m0}) \cdot \Delta N}{4I_{00} - (I_{p0} + I_{m0} + I_{0p} + I_{0m})}$$

$$\& \Delta_2 = \frac{(I_{0p} - I_{0m}) \cdot \Delta N}{4I_{00} - (I_{p0} + I_{m0} + I_{0p} = I_{0m})}$$

where $\Delta_1$ equals the distance said adjustable reflector means moves from said initial position in said first orthogonal direction to achieve said final position, $\Delta_2$ equals the distance said adjustable reflector means moves from said initial position in said second orthogonal direction to achieve said final position, $I_{oo}$ is said adjustment factor calculated from said initial position, $I_{po}$ is said adjustment factor calculated from said first position, $I_{mo}$ is said adjustment factor calculated from said second position, $I_{op}$ is said adjustment factor calculated from said third position and $I_{om}$ is said adjustment factor calculated from said fourth position.

6. A method for operating an interferometer, said interferometer comprising a beam splitter arranged to split an incoming beam of radiation so that a first portion propagates along a first optical path and a second portion propagates along a second optical path; means for reflecting said first portion of radiation back towards said beam splitter; means for reflecting said second portion of radiation back towards said beam splitter, said means adjustable in at least a first orthogonal direction and a second orthogonal direction; means for varying the optical path difference of said first and second optical paths; a detector for receiving the combined beams from said beam splitter; and control means for periodically adjusting said adjustable reflector means, said method comprising:

moving said adjustable reflector means in steps to a plurality of positions in at least said first orthogonal direction and a plurality of positions in at least said second orthogonal direction;

recording spectra and calculating an adjustment factor at each position; and moving said adjustable reflector means to a final stationary position calculated from said adjustment factors.

7. A method according to claim 6 wherein, said recorded spectra are multiplied by a first function to compensate for wavelength sensitivity to said positions of said adjustable reflector means and said spectra are divided by a second function to compensate for said spectra's standard deviation, and the result of said multiplication and said division are summed to yield said adjustment factors.

8. A method according to claim 6 wherein, said plurality of positions in said first orthogonal direction include an initial position, a second position located a distance $\Delta N$ from said initial position and a third position located at a distance $-2(\Delta N)$ from said initial position, and said plurality of positions in said second orthogonal direction include a fourth position located a distance $\Delta N$ from said initial position and a fifth position located at a distance $-2(\Delta N)$ from said initial position.

9. A method according to claim 8 wherein, said final position of said adjustable reflector means is determined by the formulae $$\Delta_1 = \frac{(I_{p0} - I_{m0}) \cdot \Delta N}{4I_{00} - (I_{p0} + I_{m0} + I_{0p} + I_{0m})}$$

$$\& \Delta_2 = \frac{(I_{0p} - I_{0m}) \cdot \Delta N}{4I_{00} - (I_{p0} + I_{m0} + I_{0p} = I_{0m})}$$

where $\Delta_1$ equals the distance said adjustable reflector means moves from said initial position in said first orthogonal direction to achieve said final position, $\Delta_2$ equals the distance said adjustable reflector means moves from said initial position in said second orthogonal direction to achieve said final position, $I_{oo}$ is said adjustment factor calculated from said initial position, $I_{po}$ is said adjustment factor calculated from said first position, $I_{mo}$ is said adjustment factor calculated from said second position, $I_{op}$ is said adjustment factor calculated from said third position and $I_{om}$ is said adjustment factor calculated from said fourth position.

10. A method according to claim 7 wherein, said first function is equal to $(h1/w)^2$ where w is the wavelength at each point in the spectra, and said second function is a linear function specific to said interferometer.

11. The method of claim 6 wherein at least one of said plurality of positions is a position of misalignment of said adjustable reflector means.

* * * * *